J. O. DAVIS.
PNEUMATIC CUSHION FOR VEHICLES.
APPLICATION FILED MAY 23, 1911.

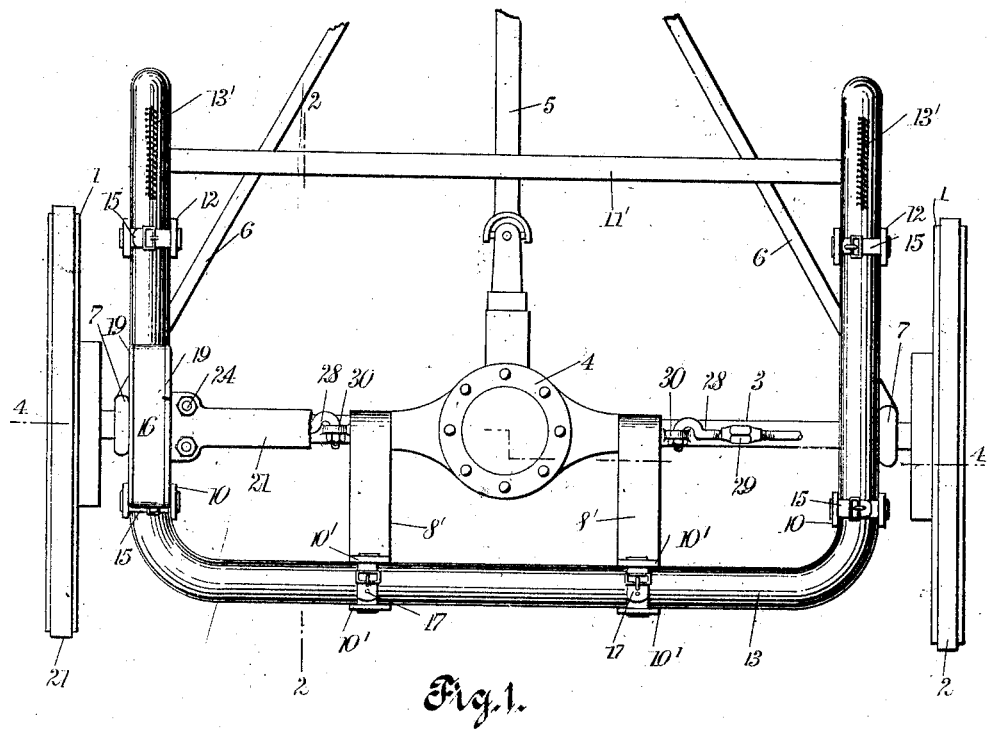

1,043,677.

Patented Nov. 5, 1912.

2 SHEETS—SHEET 2.

WITNESSES

INVENTOR
John O. Davis
BY
ATTORNEYS

UNITED STATES PATENT OFFICE.

JOHN OWEN DAVIS, OF PAWNEE, OKLAHOMA.

PNEUMATIC CUSHION FOR VEHICLES.

1,043,677.  Specification of Letters Patent.  Patented Nov. 5, 1912.

Application filed May 23, 1911. Serial No. 628,936.

*To all whom it may concern:*

Be it known that I, JOHN O. DAVIS, a citizen of the United States, and a resident of Pawnee, in the county of Pawnee and State of Oklahoma, have invented a new and Improved Pneumatic Cushion for Vehicles, of which the following is a full, clear, and exact description.

My invention relates to means for cushioning vehicles, and its object is to eliminate as far as possible, jolting and jarring caused by the wheels striking an obstruction as the vehicle passes over the surface of the ground, without being obliged to employ the expensive pneumatic tires which are now generally used on automobiles and other vehicles of the motor-driven type.

To this end I utilize a suitable cushion which is preferably tubular in form, to take up the vibration experienced when the vehicle is in motion; and I locate this cushion between the axle and the springs which support the chassis or body of the car. The springs employed are carriage springs made up of a number of strips or leaves which are bent downward; and each spring carries midway of its length, at its lowest point, a suitable shoe which rests upon a part of the tubular cushion above mentioned.

Reference is to be had to the accompanying drawings forming a part of this specification, in which the same characters of reference indicate the same parts in all the views.

Figure 4:
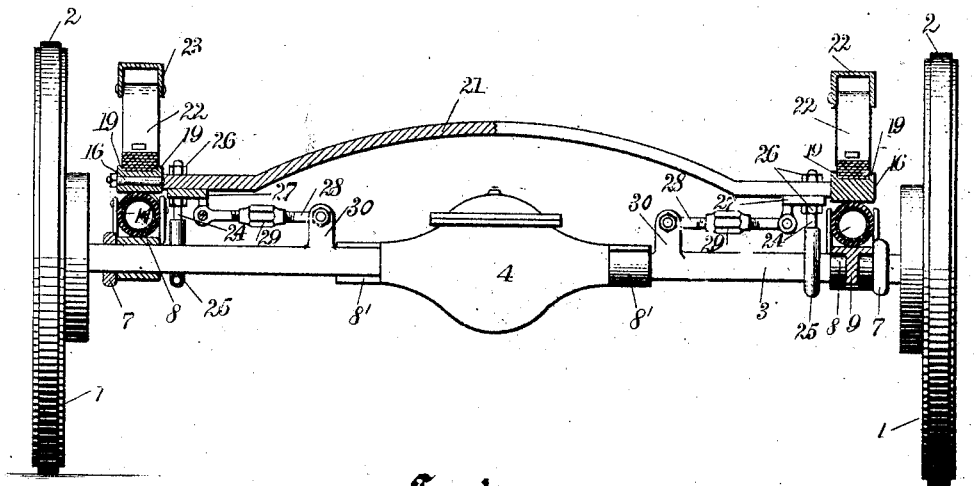
Figure 5:
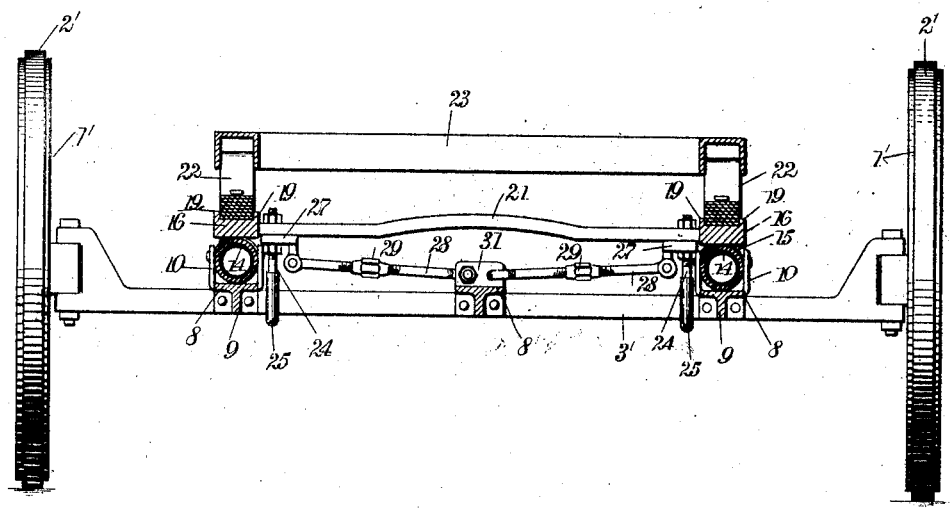

Figure 1 is a top plan of my improved pneumatic cushion and the means for mounting the same; Fig. 2 is a longitudinal vertical section on the line 2—2 of Fig. 1; Fig. 3 is a perspective view of the shoe carried by the springs to support the weight of the body of the car on the cushions; Fig. 4 is a vertical transverse section on the line 4—4 of Fig. 1, the axle shown being the rear axle; and Fig. 5 is a view similar to Fig. 4, showing the front axle.

On the drawings, the numeral 1 indicates the rear wheels, on which are mounted tires 2. These tires are preferably of solid rubber, but I may make them of metal if desired. These wheels are mounted at the ends of a hollow casing 3, which contains the drive shafts for the rear wheels, and carries midway of its length a gear casing 4, containing the driving gears which receive their motion from a shaft 5 driven by the engine. The casing 3 is connected to the body of the vehicle, not shown, by means of diagonal bars 6, the inner ends of these bars being pivotally fixed to the body of the car, and the outer ends carrying suitable bearings 7, in which the outer ends of the casing 3 are rigidly mounted.

Carried by the axle or casing 3, near the outer ends thereof, are plates 8, having strengthening webs or ribs 9, these strengthening webs or ribs being vertical and extending to the front and rear of the axle or casing 3. The plates 8 are rigidly secured to the casing 3, and have ears or lugs 10 extending upward at their sides adjacent the rear ends for a purpose which will presently be described. Riveted to the front end of each plate 8 is a strip 11, these two strips 11 being connected by means of a transverse bar 11', which rests upon and is supported by the bars 6, as shown on Figs. 1 and 2. These plates 11 have upward-projecting ears 12 arranged along their sides, these projections being similar to the projections 10. The axle 3 also carries rearward-projecting plates 8', one rigidly connected to the casing 3 on each side of the gear casing 4, as shown on Figs. 1 and 4; and the outer ends of these plates 8' have transverse lugs 10'.

My improved pneumatic cushioning means comprises an outer tubular casing 13, closed at its ends and bent into the form of a U, as shown. This casing may be made of leather or stout rubber, and it has longitudinal slits 13' near its two ends to permit the insertion of one or more sections of an inner tube 14, this inner tube being made of rubber or some other elastic material, and being provided with a suitable opening to permit the same to be inflated to distend the same and the casing 13 to enable the cushion to serve the desired purpose. The cushion 13 is supported by the plates 8, 8' and 11, being arranged to lie between the projections 10, 10' and 12. The upper ends of the projections 10 and 12 are perforated to receive short lengths of straps 15, similar straps 17 being used in connection with the projections 10'. When the casing 13 is laid in between the projections 10, 10' and 12, the straps are fastened by means of buckles to hold the cushion securely in place.

The numeral 16 indicates a suitable form of shoe shown in perspective in Fig. 5, one of which is located at each end of one of the front and rear axles to rest upon the pneumatic cushion and support the weight of the body of the car. These shoes 16 are provided with flanges 19 along their upper edges, the upper side thereof being concave, as shown, and the lower side convex. Each is provided with a central transverse perforation 20 to receive the ends of a transverse bar 21, above each of the axles, to join each pair of shoes together, the bar 21 over the rear axle being curved upward, as shown, so as to keep the same out of contact with the gear casing 4. The springs 22, on which rest the beams 23 of the framework of the body of the car, are joined to the shoes 16, these springs resting upon the top thereof between the flanges 19, and being bolted securely in place.

The bars 21 are secured to the front and rear axles by means of U-shaped staples 24. These staples are incased in suitable tubular casings 25, which pass beneath the axles, which are threaded at their upper ends to receive binding nuts 26. The upper ends pass through the bars 21, and the binding nuts 26, of which there are two on each leg of the staple, are arranged so as to clamp the bar between them. Between the lower surface of the bars 21, at each end thereof, and the lower nuts 26, I place a plate 27, this plate having a pair of lugs or ears projecting downward adjacent its inner end, these ears being perforated to receive a pin, which affords pivotal connection to a link or bar 28. This link or bar 28 is made in two sections which are connected together by means of a turn-nut 29, so that the length thereof can be adjusted to suit circumstances. The inner end of each bar 28 is pivotally connected to an upstanding lug 30, carried by the casing 3, and the staples 24 and the links 28 serve to secure the bars 21 and the shoes 16 to the axle casing 3, and through the connection of the bars 21 and the springs 22 to the beams of the chassis 23, the axle is secured to the car.

On Fig. 5 the front wheels are shown at 1' and the tires therefor at 2', 3' being the front axle, to which the wheels are connected in such a way that they can be moved around vertical pivots at the outer ends of the axle 3'. The front axle has preferably only one forward-extending plate 8', and this plate has a lug 31 at its rear end, to which the inner ends of the adjustable links 28 are joined.

The bars 6 serve to anchor the axle casing 3 to the car, and, hence, the bars 21 and the shoes 16 through the springs 22 are connected to the framework of the chassis. The adjustable links 28 will prevent the body of the car from moving laterally or along the length of the front and rear axles. At the same time, the staples 24 and the pivotal link connection between the two axles and the bars 21 will permit the shoes 16 to have a certain degree of vertical movement to compress the pneumatic cushion and deaden the jolting to which the occupants of the car would be subjected.

The vertical movement of the shoes 16 takes place by reason of the fact that the pivot bolts connecting the links 28 to the lugs 30 and 31, and the plates 27, are in practice not perfectly tight; they are tight enough, it is true, to prevent the lateral swing of the chassis or body of the car, but not tight enough to prevent the rotation of the links 28 through a certain small angle around the pivotal connection of their inner ends to the lugs 30 and 31, when the shoes 16 move up and down in practice.

It will be observed that the lower side of each of the shoes 16 is convex. These sides rest directly upon the outer casing 13 of the cushion, and when the cushion is inflated to the required degree, the weight of the body of the car is supported upon these parts. In case one of the wheels should encounter an obstruction, throwing the wheel upward as the same passes over the obstruction, the jolting would be deadened by the cushion 14, and not be transmitted to the body of the car through the axle and framework supported thereby. The convex lower side of the shoe 16 makes the action of the cushion very sensitive. A light jolting will cause the shoe to compress the cushion very little, and whenever a heavy jolting is given to the vehicle while running, the curved lower surface of the shoe 16 will engage a larger area of the cushion 13, and thus automatically increase the cushioning action.

By means of my improved cushioning device it is not necessary to employ pneumatic tires, and by locating the same in the position shown and described, the cushion carries only the weight of the body of the car and its occupants. The cushioning device does not have to bear the additional weight of the wheels and axles, as in the case of pneumatic cushions in the form of tires carried on the rims of the wheels themselves.

I wish to have it understood that I may employ a stout leather sleeve to fit around the outer casing 13 of the cushion at each of the points on which the shoes 16 rest. These sleeves will prevent any wear or chafing of the cushion 13 as the shoes 16 move up and down.

Having thus described my invention, I claim as new and desire to secure by Letters Patent:

1. In a device of the kind described, the combination of an axle, plates carried by said axle adjacent its ends, plates supported by said axle and projecting laterally therefrom between said first-named plates, a U-shaped pneumatic cushion supported by said plates, means attached to said plates for holding said cushion in place, and means for connecting the body of a vehicle to said axle in position to rest upon said cushion.

2. In a device of the kind described, the combination of an axle, plates supported adjacent the ends of said axle, plates carried by said axle and projecting therefrom between said first-named plates, extensions carried by said first-named plates, said extensions projecting in opposite directions to the said second-named plates, upstanding lugs arranged at the sides of the said first-named plates and their extensions, transverse lugs arranged adjacent the outer ends of said second named plates, a U-shaped pneumatic cushion supported by said plates and resting between said lugs, straps passing through openings in said lugs to secure said pneumatic cushion in place, and means for connecting the body of a vehicle to said axle in position to rest upon said cushion.

3. In a device of the kind described, the combination of an axle, a pair of supporting shoes arranged above the ends thereof, a transverse supporting bar connected to said shoes at its ends, carriage springs connected to said shoes at their mid points and to the framework of the body of a car at their ends, staples connected to the opposite ends of said bar and passing around the axle to connect the bar and the axle together, and a pair of extensible links pivotally connected to said bar at one end and to the said axle at the other, said links being parallel to said bar, and said links and said staple permitting relative movement of said bar and said axle.

4. In a device of the kind described, the combination of an axle, a U-shaped tubular pneumatic cushion, said cushion being supported by said axle and having its base parallel with said axle, the arms of said U-shaped cushion extending longitudinally of the car to which said axle is connected, and a pair of shoes having convex under surfaces resting upon the longitudinal arms of said U-shaped cushion, said shoes being connected to the framework of the body of the car or vehicle, whereby the weight of the body of the car will be supported by said cushion, and whereby the convex lower surface of the supporting shoes will cause the cushioning effect of said cushion to be automatically increased when said cushion is compressed during the movements of the vehicle.

5. In a device of the kind described, the combination of an axle, supporting means arranged above the opposite ends of said axle, means arranged longitudinally of said axle and joined to said supporting means at its ends to connect the same together, means for connecting said supporting means to the body or framework of a vehicle of which said axle forms a part, and means arranged longitudinally of said axle and pivotally connected thereto at one end and to said supporting means at the other end, for preventing the said supporting means from swinging laterally with respect to the vehicle, while at the same time permitting a certain amount of vertical movement of said supporting means.

6. In a device of the kind described, the combination of an axle, supporting means arranged above the opposite ends of said axle, means arranged longitudinally of said axle and joined to said supporting means at its ends to connect the same together, resilient means for connecting said supporting means to the body or framework of a vehicle of which said axle forms a part, and means arranged longitudinally of said axle and pivotally connected thereto at one end and to said supporting means at the other end, for preventing the said supporting means from swinging laterally with respect to the vehicle, while at the same time permitting a certain amount of vertical movement of said supporting means.

7. In a device of the kind described, the combination of an axle, supporting means arranged above the ends thereof, means joined to said supporting means for connecting said supporting means at each end of the axle together, resilient means for connecting said supporting means to the framework or body of a vehicle of which said axle forms a part, and means carried by said first-named connecting means and movably engaging said axle, said means arranged longitudinally of said axle and pivotally connected to said first-named connecting means at one end and to said axle at the other end, to permit a certain amount of vertical movement of said supporting means, and to prevent said supporting means from moving laterally of the vehicle.

In testimony whereof I have signed my name to this specification in the presence of two subscribing witnesses.

JOHN OWEN DAVIS.

Witnesses:
JOHN W. WILSON,
PEARL CATLETT.